United States Patent [19]
Grant et al.

[11] Patent Number: 5,971,137
[45] Date of Patent: Oct. 26, 1999

[54] POWER ROLLER CONVEYOR

[75] Inventors: Patrick J. Grant, Lapeer; Richard A. Wallace, Madison Heights, both of Mich.

[73] Assignee: Comau North America, Inc., Auburn Hills, Mich.

[21] Appl. No.: 09/047,585

[22] Filed: Mar. 25, 1998

[51] Int. Cl.⁶ .................................................. B65G 13/02
[52] U.S. Cl. ...................... 198/782; 198/780; 198/860.1
[58] Field of Search .................................... 198/782, 780, 198/781.03, 860.1, 861.1

[56] References Cited

U.S. PATENT DOCUMENTS

| | | |
|---|---|---|
| 3,825,108 | 7/1974 | Stone . |
| 4,399,908 | 8/1983 | Gunti . |
| 4,473,149 | 9/1984 | Vogt et al. . |
| 4,488,639 | 12/1984 | Vogt et al. . |
| 4,501,353 | 2/1985 | Burkhardt . |
| 4,577,747 | 3/1986 | Martin . |
| 4,664,252 | 5/1987 | Galbraith . |
| 4,706,801 | 11/1987 | Vessey . |
| 4,753,339 | 6/1988 | Vogt et al. . |
| 4,815,588 | 3/1989 | Katsuragi et al. . |
| 4,844,231 | 7/1989 | Usui . |
| 4,930,618 | 6/1990 | Roh . |
| 4,993,541 | 2/1991 | Roh . |
| 5,038,923 | 8/1991 | Evans . |
| 5,040,669 | 8/1991 | Blocker . |
| 5,086,910 | 2/1992 | Terpstra . |
| 5,096,051 | 3/1992 | Abels . |
| 5,137,145 | 8/1992 | Clopton .............................. 198/860.1 |
| 5,147,024 | 9/1992 | Yamada . |
| 5,148,909 | 9/1992 | Becker et al. . |
| 5,289,913 | 3/1994 | Fujio et al. .............................. 198/780 |
| 5,361,895 | 11/1994 | Solcz . |
| 5,372,247 | 12/1994 | Nishikawa . |
| 5,392,899 | 2/1995 | Wakabayashi . |
| 5,447,224 | 9/1995 | Gebhardt . |
| 5,558,205 | 9/1996 | Helgerson et al. . |
| 5,558,206 | 9/1996 | Helgerson et al. . |

FOREIGN PATENT DOCUMENTS

| | | |
|---|---|---|
| 405024623A | 2/1993 | Japan . |
| 406127652A | 10/1994 | Japan . |

OTHER PUBLICATIONS

English Language Abstract of JP406127652A.
English Language Abstract of JP405024623A.

*Primary Examiner*—William E. Terrell
*Assistant Examiner*—Khoi H. Tran
*Attorney, Agent, or Firm*—Dykema Gossett PLLC

[57] ABSTRACT

A cantilevered roller assembly for a conveyor system includes a non-rotating shaft, a sprocket, a roller, a sleeve, and a clutching spring. The non-rotating shaft has a first end with a first retention feature and second end with a second retention feature. The sprocket is rotatably disposed over the shaft. The roller is rotatably disposed over the shaft adjacent the sprocket. The sleeve is slidably and rotatably disposed over the non-rotating shaft. The sleeve has a first end in non-rotatable engagement with one of the sprocket and the roller on a first end and has a second end with an adjusting nut threadably disposed thereover. The clutching spring is axially disposed between the second end of the sleeve and the second end of the shaft. The clutching spring induces a clutching load between the sprocket and the roller. Rotation of the nut varies the clutching load between the sprocket and the roller.

4 Claims, 4 Drawing Sheets

POWER ROLLER CONVEYOR

FIELD OF THE INVENTION

The invention relates to conveyors having power driven rollers.

BACKGROUND OF THE INVENTION

Conveyor systems are widely used to move objects from a first location to a second location. Conveyors can take on a wide variety of characteristics, depending, in part, on the nature of the goods being moved, on the environmental conditions in which the conveyor will be used, and the specific path of the conveyor including changes in vertical elevation, turns and the radii of the turns.

One type of conveyor is a power roller conveyor. Power roller conveyors have a plurality of rollers drivingly connected with a driving means such as an electric motor. The rollers are engaged, directly or indirectly, by the goods being moved or conveyed. Rotation of the rollers moves the goods in a desired direction. Driving torque is communicated to each driving roller by a drive system commonly comprising in part a belt, a chain, or a drive shaft. Each type of drive system has certain advantages and disadvantages. Drive shafts are able to transmit high levels of torque to the rollers via gear sets connecting the drive shaft to the rollers, but such systems are expensive and can be difficult to service. Chain drive systems are durable and can also transmit high levels of torque to the rollers. Chains, however, require lubrication which may make them unsuited for use in clean environments. Belts typically do not require lubrication and are therefore cleaner than chains. Flat and V-belts, however, are somewhat subject to slipping. Known toothed belts have teeth on just one side and can only be drivingly engaged on that one side, making the possible relative orientations of the driving unit and the rollers more limited than those possible with chains.

The rollers in some conveyors are preferentially mounted in cantilever fashion to a supporting structural member. The rollers are typically rotatably disposed on a shaft which is fixed on one end relative to the structural member. The cantilever mounting arrangement facilities moving the rollers. However, the shaft must be sized sufficiently large to support a pallet or the like without bending.

Another concern with known conveyors is in preventing damage to both the conveyor and to the goods or objects being moved when the goods or objects being conveyed are stalled or jammed up on the conveyor. Such stalling can occur when goods accumulate at the end of the conveyor if there is a delay in removing the goods from the conveyor. The damage results from rollers continuing to rotate relative to the stationary goods. Also, such stalling may cause the motor to require more power to keep the rollers rotating at a constant speed. An oversized motor may be needed to ensure that the motor will not be stalled. One approach used to minimize the risk of damage and excess energy consumption is to provide a clutching mechanism between the roller and the drive gear. When a roller experiences drag torque exceeding a predetermined magnitude, as might occur with stalling of goods, the clutch slips, allowing the roller to stop rotating even though the drive belt and sprocket keep moving. For many clutching systems, the torque at which the clutch slippage occurs either cannot be adjusted at all or cannot be adjusted very easily.

Some known power roller conveyors rely on an axial deflection of springs, such as wave washers or Belleville springs, to generate a clutching preload. In some such power roller conveyors, there is relative rotation between the elements which axially contain the springs, either when the rollers are rotating or when they are stalled. This relative rotation can cause the springs to wear and deteriorate, decreasing the axial load the springs are able to provide and/or causing them to break. In one known clutching system in which the springs rotate in unison with the adjacent elements, the arrangement is not well suited for packaging into a cantilevered roller application.

Another concern with known power roller conveyors relates to the level of difficulty involved in both shifting the relative locations of the rollers to accommodate a change in package size and the ease of removal of the rollers from the conveyors. Many conveyors use bores in the supporting structure for mounting the rollers. This limits the locations of the rollers to the locations of the bores. Some supporting structures have longitudinally extending T-slots for fixing the rollers in place. The T-slots enable infinite adjustment of the space between the rollers. However, even with T-slots, the rollers are often more difficult to access and reposition within or remove from the conveyor's supporting structure by surrounding supporting members and guards.

A further concern with known belt or chain driven power conveyors employing separate left and right hand rollers relates to coupling the rollers to a common drive motor. Usually, a connecting shaft extends between the two sides. However, if the shaft is difficult to remove and/or install, then the chain or belt is consequently more difficult to remove and/or install.

SUMMARY OF THE INVENTION

The disclosed invention advantageously employs a toothed drive belt having teeth on both sides of the belt. This enables the belt to be drivingly engaged on an inner side by a sprocket driven by a motor, while at the same time an outer side of the belt engages roller sprockets which rotate the conveyor rollers.

The disclosed invention advantageously supports cantilever mounted rollers at a point distal to the cantilever mounting, so as to minimize the diameter of the roller shaft required.

The disclosed invention advantageously includes a roller clutching mechanism which is providing engagement between a roller and a sprocket well suited for use with a cantilevered roller.

The disclosed invention advantageously includes a quick disconnect shaft which drivingly connects first and second sides of the conveyor. The quick disconnect shaft is easily removed from the conveyor to facilitate removal and installation of drive belts or chains.

The disclosed invention also advantageously includes a combination support and guard for the drive belt which is very easily removed to facilitate access both to the belt and to the rollers.

A power roller conveyor system includes an elongated rail member, a cantilevered roller assembly, and a support. The elongated rail member has a longitudinally extending slot. The cantilevered roller assembly has a first end threadably engaging a nut which is slidably and non-rotatably disposed in the slot of the rail member. The support is fixed to the rail member and supports a second end of the roller assembly.

A cantilevered roller assembly for a conveyor system includes a non-rotating shaft, a sprocket, a roller, a sleeve, and a clutching spring. The non-rotating shaft has a first end with a first retention feature and a second end with a second retention feature. The sprocket is rotatably disposed over the shaft. The roller is rotatably disposed over the shaft adjacent to the sprocket. The sleeve is slidably and rotatably disposed over the non-rotating shaft. The sleeve has a first end in non-rotatable engagement with one of the sprocket and the roller on a first end. The sleeve has a second end with an adjusting nut threadably disposed thereover. The clutching spring is axially disposed between the second end of the sleeve and the second end of the shaft, inducing a clutching load between the sprocket and the roller. Rotation of the nut varies the clutching load between the sprocket and the roller.

A power roller conveyor system includes an elongated rail member, a first drive sprocket, a second drive sprocket, a plurality of roller sprockets and an endless belt. The elongated rail member has first and second ends. The first drive sprocket is disposed at the first end of the elongated rail member. The second drive sprocket is disposed at the second end of the elongated rail member. The roller sprockets are disposed between the first and second ends of the rail member. The endless belt has inner teeth on an inner side thereof and outer teeth on an outer side thereof with the inner teeth engaging both the first drive sprocket and the second drive sprocket. The outer teeth engage the roller sprockets.

A power roller conveyor system includes an elongated rail member, a plurality of roller sprockets, a belt, and a combined belt support and belt guard. The elongated rail member has a longitudinally extending slot. The roller sprockets each have an axis of rotation. The sprockets are drivingly engaged with coaxial rollers and are disposed along the rail member. The belt is engaged on a first side by the sprockets. The combined belt support and belt guard is fixed to the rail member. A portion of the combined belt support and belt guard is disposed in the longitudinally extending slot. The combined belt support and belt guard supports the belt on a side thereof opposite the sprockets. The side is spaced from the sprockets a distance selected to facilitate engagement between the sprockets and the belt. The combined belt support and belt guard has a feature extending in the direction of the sprockets preventing the belt from slipping off the sprockets in at least one direction.

A power roller conveyor system includes a first elongated rail member, a second elongated rail member, a first drive member, a second drive member, a first shaft portion, a second shaft portion, and a drive shaft. The second elongated rail member is parallel to the first elongated rail member. The first drive member is rotatably mounted to the first rail member and has a first engagement feature. The second drive member is rotatably mounted to the second rail member and has a second engagement feature. The first shaft portion includes a first flange and a first tube rigidly connected to each other. The first shaft portion has an engagement feature complementary to the first engagement feature. The second shaft portion includes a second flange and a second tube rigidly connected to each other. The second shaft portion has an engagement feature complementary to the second engagement feature. The drive shaft has a first end fixed within the first tube. The drive shaft has a second end fixed within the second tube by a coupling. The coupling is configured to enable selective engagement and disengagement between the second tube and the second end of the drive shaft.

DESCRIPTION OF PREFERRED EMBODIMENTS

Figure 1:
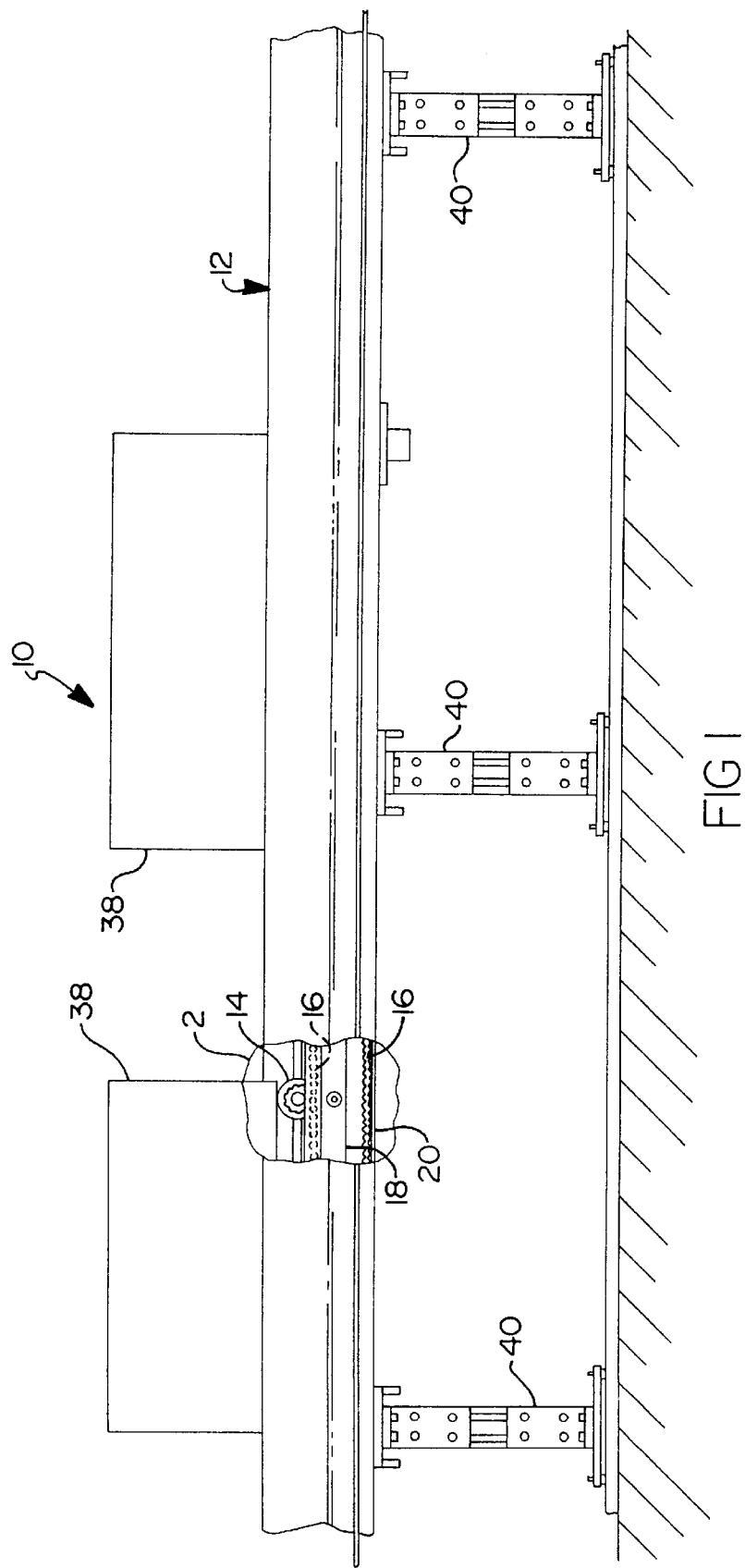
FIG. 1 is a side view of a power roller conveyor embodying the present invention.
Figure 2:
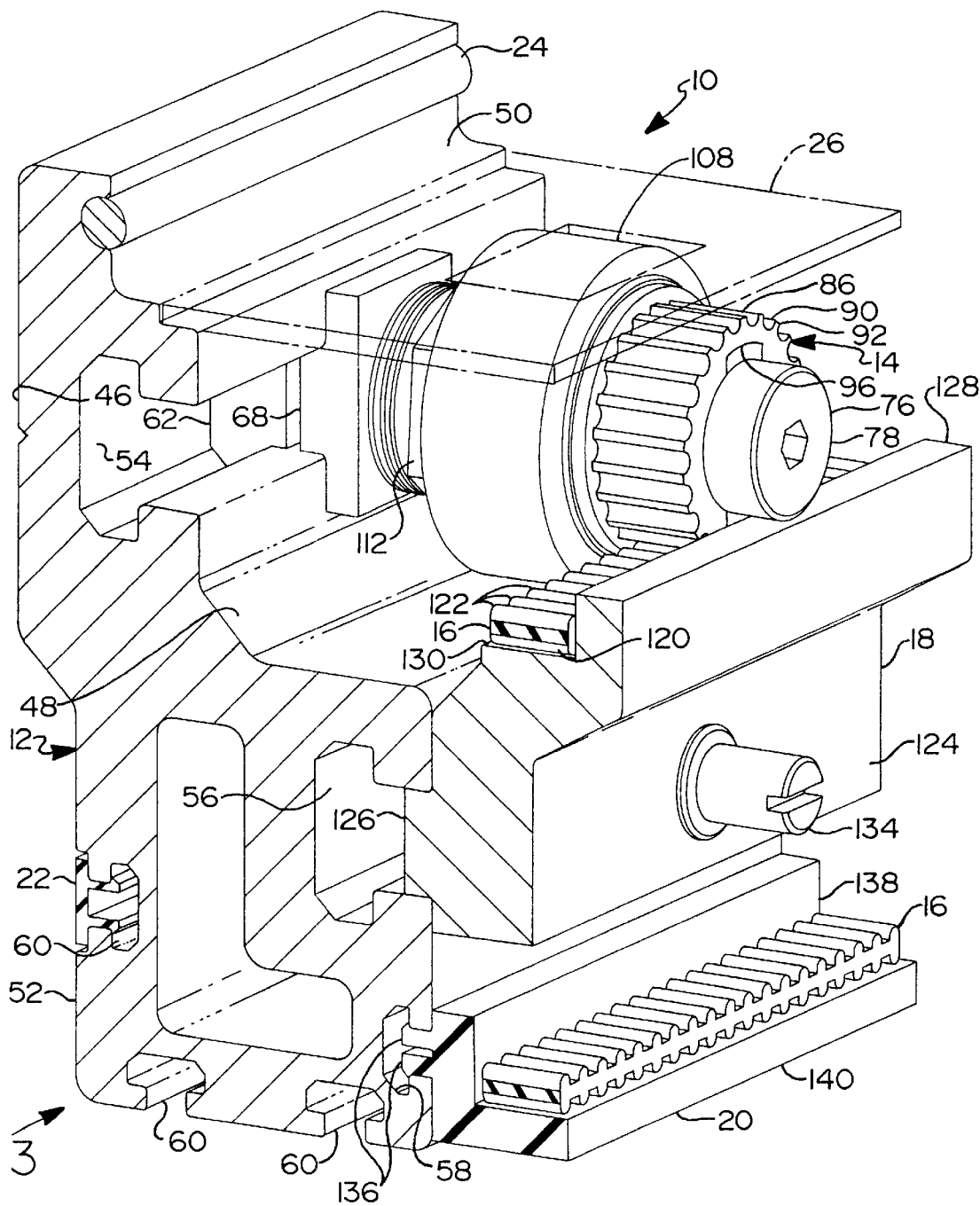
FIG. 2 is a perspective view of a portion of the power roller conveyor system of FIG. 1 enclosed by circumscribing line 2.

A power roller conveyor 10 is shown in part in FIG. 1. A pair of parallel longitudinally extending rail members 12 define two opposed sides of conveyor 10. A plurality of cantilevered roller assemblies 14 are mounted in each of rail members 12 as best shown in FIGS. 2–5. A drive belt 16 is supported by support or guard 18, facilitating its engagement with roller assembly 14. A lower belt support 20 maintains a lower portion of belt 16 in a desired position.

Also attached to rail members 12 are slot fillers 22 and bumpers 24. A cover 26 extends the length of power roller conveyor 10 and extends laterally between rail members 12. Cover 26 can be a single unitary piece or can be comprised of a plurality of smaller elements, each extending only a fraction of the length of conveyor 10. The shorter length covers 26 would be easier to manipulate for installation and removal purposes.

Figure 5:
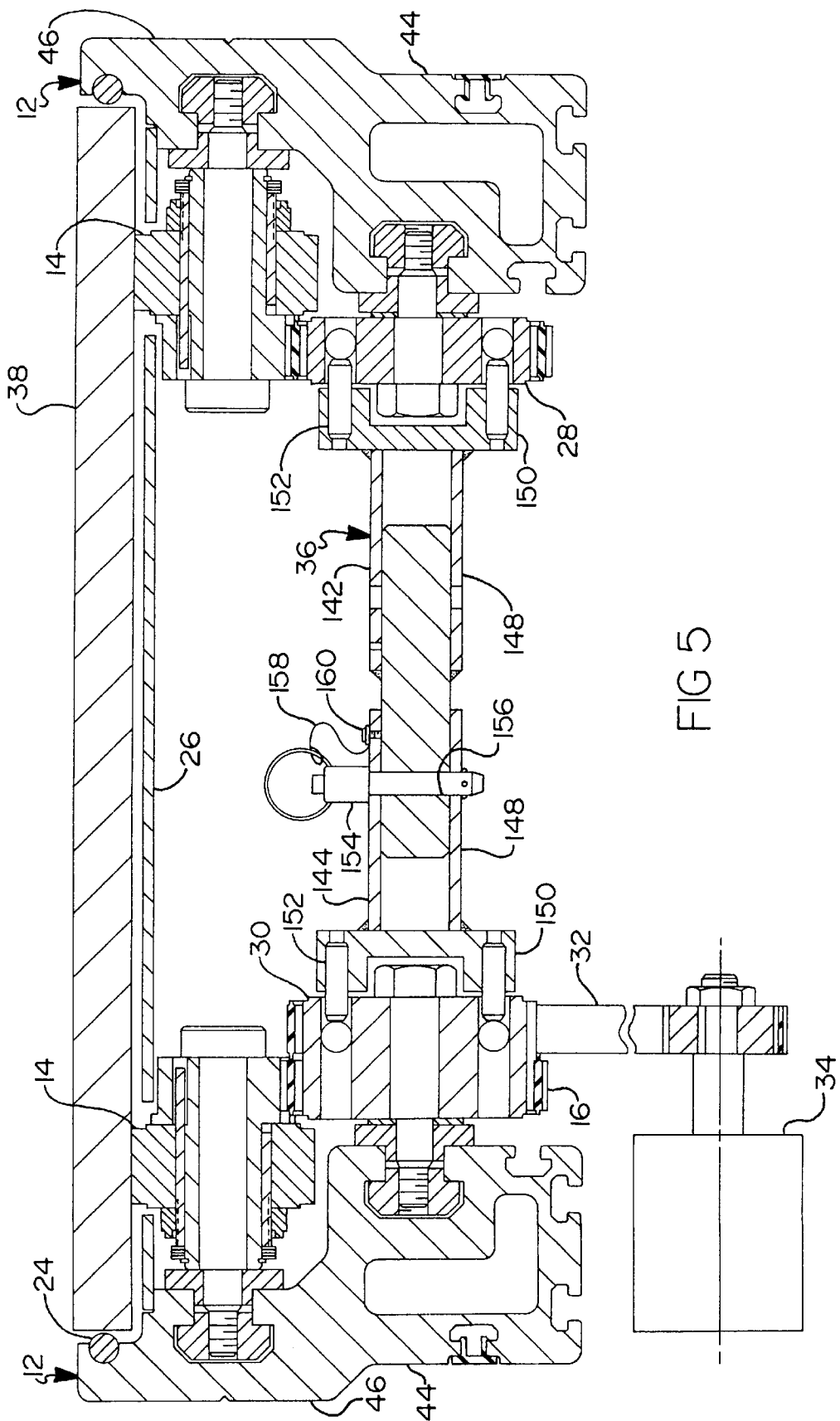
FIG. 5 is a sectional end view of a power roller conveyor at its driving end.

Drive belt 16 wraps around a drive sprocket 28 at each end of the one of rails 12. A second drive belt 16 wraps around a drive sprocket 28 at one end of the other rail 12 and around a modified drive sprocket, or a dual sprocket 30 at the other end. Dual sprocket 30 is engaged both by one of drive belts 16 and a motor belt 32. Motor belt 32 drivingly connects dual sprocket 30 with a drive motor 34. A quick disconnect shaft 36 extends laterally between dual sprocket 30 and one of drive sprockets 28 as best shown in FIG. 5. Pallets, boxes, trays or the like 38 are displaced by roller assemblies 14. Conveyor supports 40 provide the necessary support for power roller conveyor 10.

Rail members 12 are aluminum extrusions formed to a predetermined length best suited to the particular application for which the conveyor 10 is designed. As shown in FIG. 5, both left and right hand rail members 12 are identical. One rail member 12 is merely rotated 180° relative to the other to provide a symmetrically opposite part. The cross section of rail members 12 can be defined as being substantially "b" or "d" shaped, depending on whether one is looking at the left hand or the right hand side. Rail member 12 has a box portion 44 defining its lower end, and a vertically extending portion 46 defining its upper end. Vertically extending portion 46, in combination with support 18, defines a roller assembly pocket 48 which receives roller assembly 14. Rail member 12 has a first or inner side 50 and a second or outer side 52. A first or upper T-slot 54 is used for mounting roller assembly 14. A second, or intermediate T-slot 56, also disposed in first side 50 is used for the mounting of guard 10. A third, smaller T-slot 58 along first side 50 is used for the mounting of lower belt support 20. Rail member 12 has three other longitudinally extending T-slots 60 with one being located on second side 52 and receiving slot filler 22. Two of the T-slots 60 are located on a lower side of box portion 44, and are used for attaching rail members 12 and to conveyor supports 40.

Threaded T-slot nuts 62 are slidably disposed in both first T-slot 54 and second T-slot 56. Each of nuts 62 has a flange portion for engagement with rail member 12 and a neck portion extending through a correspondingly narrowed collar portion of T-slots 54 and 56. Clamping plates 68, each with a through bore, are aligned with T-slot nuts 62. Clamping plates 68 have oversized flange portions and narrower neck portions, with the neck portions extending into the collar portions of their associated slots 54 and 56.

Roller assembly 14 is rotatably mounted on a shaft 76 formed of steel. Shaft 76 has a head 78 disposed at its first end. Head 78 is of a constant diameter and is configured to accept a wrench, such as an Allen wrench or the like. Shaft 76 has an axially extending shank portion 80 smaller in diameter than head 78 and extending therefrom, a shoulder portion 82 slightly smaller in diameter than shank portion and sized to be received by the bore in clamping plate 68, and a threaded or second end 84 threadably engaged with the threads of the T-slot nut 62 disposed in first T-slot 54. T-slot nut 62 is prevented from rotating within slot 54 by its sides. The relative rotation of threaded end 84 within nut 62 draws an end of shank portion 80 into engagement with clamping plate 68. Shaft 76 defines an axis of rotation 85 for roller assembly 14.

An interbushing 86, molded of plastic, is slidably disposed over shank portion 80. Interbushing 86 has a length slightly less than that of shank portion 80 to facilitate its rotation on shank portion 80. Interbushing 86 has a through bore 88 axially extending therethrough which provides a slip fit relationship with the diameter of shank portion 80, allowing the rotation of interbushing 86 about shank portion 80 with minimal friction therebetween. A roller sprocket 90 having radially extending sprocket teeth 92 is formed on an end of interbushing 86 most proximate to head 78. A bushing portion 94 axially extends from roller sprocket 90 toward clamping plate 68. Roller sprocket 90 has at least one axially extending slot 96 therein which is open on a side facing clamping plates 68 and disposed radially outwardly of an outer diameter of bushing 94.

A sleeve 100, formed of steel, is slidably disposed over bushing portion 94. Sleeve 100 has a first end 102 with a finger 104 slidably disposed within slot 96. Finger 104 and slot 96 have substantially the same arc length to ensure that sleeve 100 and interbushing 86 rotate as a unit. Sleeve 100 has a threaded second end 106 disposed opposite finger 104. A roller 108, formed of heat treated oil impregnated sintered iron, is rotatably disposed over sleeve 100.

A torque prevailing clamping nut 112 is threaded over end 106 and into engagement with roller 108. Nut 112 includes an anti-rotation feature, such as a deformation of the nut thread, or a piece of plastic such as nylon or the like disposed at the threads which prevent rotation of nut 112 unless a predetermined level of torque is exceeded.

A retaining ring 114, or, alternatively, a snap ring, is disposed in a groove at an end of bushing portion 94 opposite roller sprocket 90. A plurality of wave washers 116 are axially disposed between retaining ring 114 and threaded end 106 of sleeve 100. Shim rings 118 are axially disposed on both sides of wave washers 116 to provide reaction surfaces therefor. The spring rate of the wave washers 116 can be selectively varied by increasing or decreasing the number of wave washers and by selecting wave washers of certain spring rates to provide the desired spring rate. The preload of wave washers 116 against sleeve 100 can be varied by varying the thickness and number of shim rings 118 chosen.

The axial spring load of wave washers 116 against threaded end 106 of sleeve 100 is transferred by nut 112 to roller 108 which in turn reacts against roller sprocket 90. Roller 108 is squeeze on both sides by the spring load. This results in a fictional drag load between roller 108 and roller sprocket 90 and nut 112. Roller 108 therefore tends to rotate as a unit with sprocket 90 and nut 112.

Figure 4:
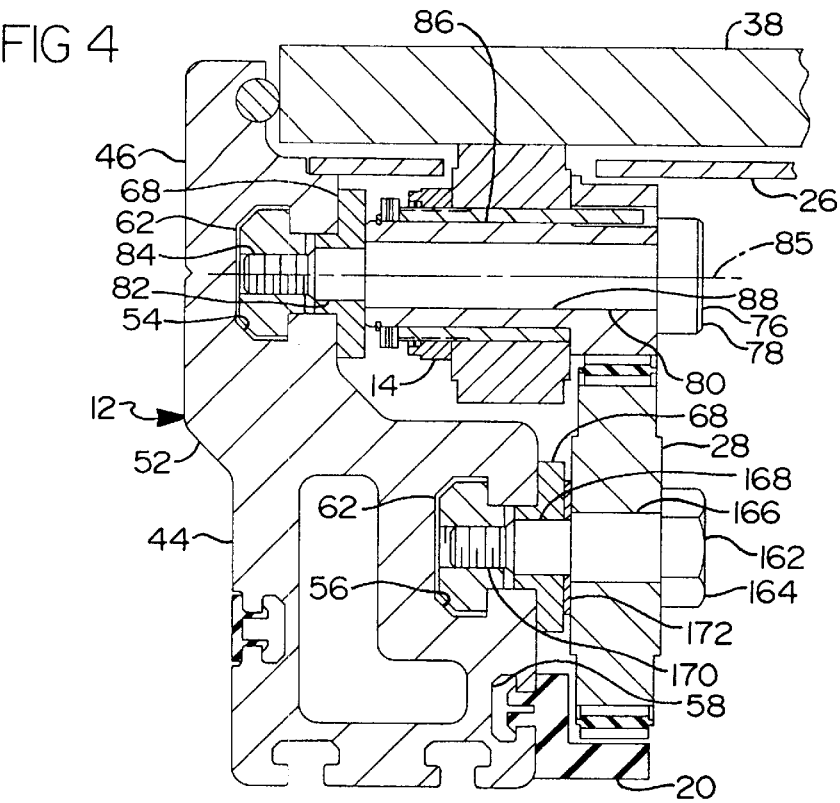
FIG. 4 is a sectional end of the conveyor through its drive sprocket.
Figure 3:
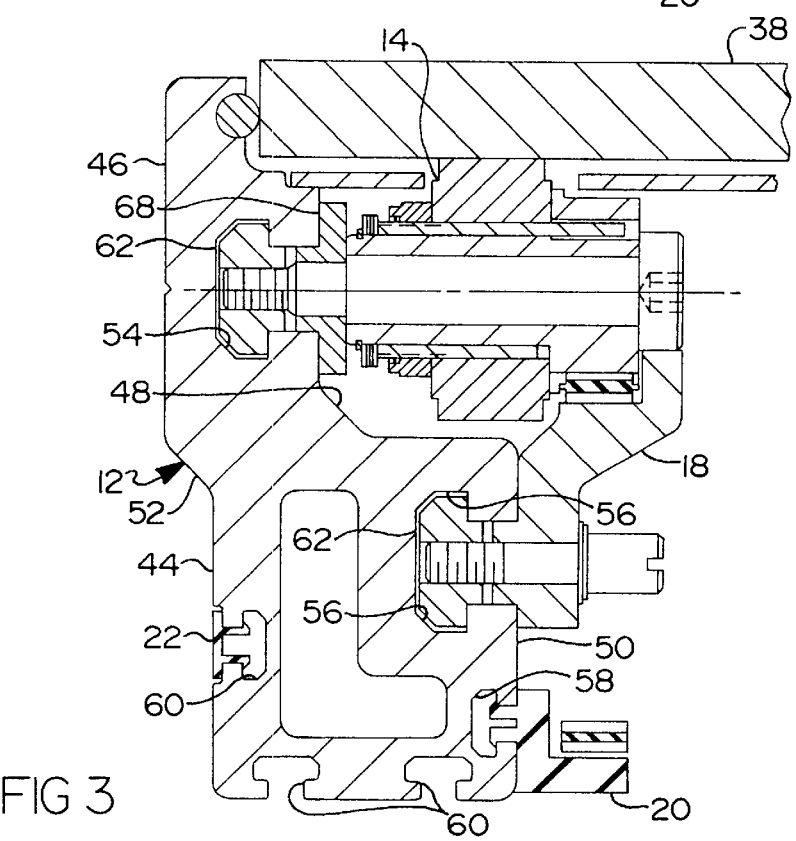
FIG. 3 is a sectional end view of the portion of the power roller conveyor of FIG. 2 in the direction of arrow 3.

Drive belt 16 has both inner teeth 120 on an inner side of belt 16 and outer teeth 122 on an outer side of belt 16. Outer teeth 122 engage sprocket teeth 92 of roller sprocket 90. Inner teeth 120 engage drive sprocket 28 as shown in FIGS. 4 and 5 and dual sprocket 30 as shown on the left side of FIG. 5.

Support 18 is also an aluminum extrusion. Support 18 has a mounting portion 124 defining a neck 126 approximately equal to the width of the collar portion of second T-slot 56. Support 18 also includes an outer lip which supports head 78 as well as defining, in combination with vertically extending portion 46, roller assembly pocket 48. Consistent engagement of head 78 with outer lip 128 of support 18 is an advantageous result of head 78 being round in shape. An upper belt support surface 130, in alignment with roller sprocket 90 and approximately equal in width to belt 16, supports drive belt 16 at a distance from axis 85 ensuring engagement between sprocket teeth 92 and outer teeth 122.

Support 18 has a plurality of apertures 132 passing through neck 126. Each aperture 132 receives a screw 134. The threaded ends of screws 134 engage T-slot nuts 62 disposed on second T-slot 56 to retain support 18 to rail member 12. Screws 134 are provided with a driving feature, such as a slot for screwdriver, or a knurled surface for finger tightening, or a hex head for tightening by a box wrench, or a six sided aperture for use with an Allen wrench, or any other feature suited for applying a torsional tightening force.

Lower belt support 20 is formed of plastic. It has a snap-in mounting feature 136 comprising a pair of opposed tines having engaging barbs for engaging an inside edge of third T-slot 58. Lower belt support 20 is elongated and has a vertical portion 138 and a horizontal portion 140 extending therefrom. Drive belt 16 is supported by horizontal portion 140.

Quick disconnect shaft 36, best shown in FIG. 5, has a first coupling portion 142 connected to a second coupling portion 144 for rotation about axis 85. A drive shaft 146 extends between and connects first coupling portion 142 and second coupling portion 144. Both first coupling portion 142 and second coupling portion 144 have a tube 148 extending from a flange 150. A plurality of pins 152 extend from flanges 150 into receiving apertures within drive sprocket 28 and dual sprocket 30. Drive shaft 146 is disposed in part within the tubes 148 of both first coupling portion 142 and second coupling portion 144. Drive shaft 146 is retained within first coupling portion 142 by welding it to its tube 148. Drive shaft 146 is retained within second coupling portion 144 by a lock pin 154 slidably disposed in a receiving aperture 156. A retaining wire 158 connects lock pin 154 with second coupling portion 144 to prevent the loss of pin 154 when lock pin 154 is pulled from aperture 156. One end of wire 158 is looped through a portion of lock pin 154, while a second end of wire 158 is affixed to second coupling portion 144 by a retaining screw 160. Although quick disconnect shaft 36 is shown here in use with a drive sprocket 28 and a dual sprocket 30, it should be appreciated that shaft 36 can also be used to connect a pair of drive sprockets 28 or alternative drive members, such as pulleys or gears or connecting shafts. Pin 154 has spring loaded detent balls at its tip to retain pin 154 in aperture 156.

Drive sprocket 28 is mounted to rail member 12 via a short shaft or shoulder bolt 162. Shoulder bolt 162 has a head 164, a shank portion 166 upon which drive sprocket 28 is rotatably located, and a shoulder portion 168 adjacent to a threaded portion 170. An anti-friction washer 172 is slidably disposed over shoulder portion 168, abutting the end of shank portion 166. Shoulder portion 168 also receives a clamping plate 68 with its flange portion disposed against anti-friction washer 172. Threaded portion 170 engages a T-slot nut 62 disposed in second T-slot 56. After sprocket 28 has been moved to its desired position along rail member 12, a wrench is used to tighten shoulder bolt 162, thereby fixing the location of drive sprocket 28 along rail member 12. Dual sprocket 30 is mounted in an identical manner except a longer shoulder bolt 162 is used.

Cover 26 or covers 26 extend between rail members 12. Covers 26 have openings through which rollers 108 protrude for engagement with pallets 38 or the like. Covers 26 prevent debris from dropping onto belts 13 and other components of the conveyor mechanism.

Advantages of the present invention are more apparent when the assembly and operation of the invention are understood. Therefore, the assembly and operation of the invention will now be described in more detail.

A roller assembly 14 is assembled in the following manner. Torque prevailing nut 112 is threaded over second end 106 of sleeve 100. Roller 108 is slipped over first end 102 and into axial engagement with nut 112. Sleeve 100 and roller 112 are in turn slipped over interbushing 86, with finger 104 sliding into slot 96 of roller sprocket 90. Roller 108 is pushed into axial engagement with roller sprocket 90. Shim rings 118 with wave washers 116 disposed therebetween are slipped over the end of bushing portion 94 extending beyond sleeve 100. Retaining ring 114 is installed in the groove at the end of bushing portion 94 to retain wave washers 116, shim rings 118 and sleeve 100. Torque prevailing nut 112 can now be adjusted to axially compress wave washers 116. As torque prevailing nut 112 is threaded further down threaded end 106 toward first end 182 of sleeve 100, threaded end 106 is forced against shim rings 118 and wave washers 116, developing an axial load in sleeve 100. The resultant axial load is transferred from sleeve 100 to nut 112 which in turn reacts against roller 108. The axial position of nut 112 along sleeve 100 controls the magnitude of the clamping load on roller 108. The magnitude of the clamping load on roller 108, in combination with the co-efficient of friction between nut 112 and roller 108 and between roller 108 and engagement face 98, controls the magnitude of clutching torque which roller 108 is able to transmit before slipping.

The assembled roller assembly 14 is installed in rail member 12 with relative ease. First, a T-slot nut 62 is positioned to a desired location within first T-slot 54. Roller assembly 14 is slipped over shaft 76 with roller sprocket 90 abutting head 78. Clamping plate 68 is slipped over shoulder portion 82 abutting shank portion 80. Threaded end 84 is threaded into nut 62, and head 78 is used to tighten shaft 76 to an appropriate clamping torque for retaining roller assembly 14 in its selected location. A plurality of roller assemblies 14 are assembled and installed as required.

As an alternative to pre-positioning T-slot nut 62 to a desired final position, one can loosely thread end 84 into T-slot nut 62 and then slip nut 62 into an end of rail member 12. The entire assembly can then be slipped along rail member 112 to the desired location before tightening shaft 76.

One significant advantage of the present invention is the ease with which roller assemblies 14 are located and relocated along the length of rail member 12. Roller assemblies 14 are spaced apart a distance typically no greater than the length of the object 38 being urged forward by conveyor. When conveyor assembly 10 is to be used to convey objects 38 of a different size, it may be desirable to change the spacing between roller assemblies 14. To relocate a roller assembly 14, one need merely remove the cover or covers 26, loosen shaft 76 sufficiently to unclamp the portion of rail member 12 between nut 62 and clamping plate 68, and axially slide roller assembly 14 to its desired new location. Once roller assembly 14 is in its new location, it can be fixed in that location by simply tightening shaft 76 to draw nut 62 and clamping plate 68 toward each other again. There is no need to remove or even disturb support 18. It is appreciated that when the spacing between roller assemblies 14 is changed, it may be necessary to alter the spacing of the openings in cover 26 to accommodate the new spacing.

Drive sprockets 28 are mounted as described above at both ends of one of the rail members, and at one end of the other rail member. A dual sprocket 30 is installed at the remaining rail end. Belts 16 are installed on each of the rail members. Supports/guards 18 are slipped under the upper portion of belts 16 to provide support therefor and to support heads 78. If roller assemblies 14 are loaded from an end of rail member 12 as described above, supports/guards 18 could be installed before belts 16 and roller assemblies 14. Lower belt supports 20 are snapped into third T-slots 58 to support belts 13. Cross members, not shown, connect left and right hand rail members 12 using the T-slots 60 in the lower side of rail members 12. The cross members are in turn engaged by conveyor supports 40 which position rail members 12 at a desired height.

Motor belt 32 is placed over dual sprocket 30 and a sprocket rotatively fixed to the drive shaft of drive motor 34. It may be desirable to adjust the position of sprockets 28 and/or 30 to tension belt 32.

Covers 26 are laid between rail members 12 with their openings receiving rollers 108.

Quick disconnect shaft 36 is installed at one end of rails 12 where dual sprocket 30 is located. Dual sprocket 30 and drive sprocket 28, each on opposed rail members 12, must be axially aligned with each. Quick disconnect shaft 36 is assembled with lock pin 154 removed and tubes 148 butted up against each other, to shorten shaft 36 to its minimum length. Pins 152 are axially aligned with apertures in one of the drive sprockets 28 and dual sprocket 30 and inserted therein. The other end of shaft 36 has its pins 152 aligned with corresponding apertures in the other of sprockets 28 and 30 and slipped there into, separating tube portions 148. Receiving apertures 156 in tube 148 and drive shaft 146 are aligned, and lock pin 154 passed therethrough.

Power roller conveyor 10 is advantageously operated in the following manner. Power roller conveyor 10 is actuated by energizing drive motor 34. The speed at which power roller conveyor 10 moves parcels 38 disposed thereon, or the conveyor line speed, is a function of the rotational speed of drive motor 34, and the drive system or mechanism disposed between motor 34 and roller 108. For example, the ratio of the diameter of the sprocket disposed on the drive shaft of motor 34 to the diameter of dual sprocket 30 provides a first ratio. The diameter of the portion of dual sprocket 30 on which motor belt 32 is disposed and the diameter of the portion of dual sprocket 30 on which drive belt 16 is disposed, although shown here as being equal, provides a second ratio for altering the ultimate line speed. Further, the diameter ratio between roller sprocket 90 and roller 108, as well as the diameter of roller 108, has an impact on the line speed. Besides employing various ratios within the drive system to vary the line speed, it is also possible to use a variable speed motor to enable adjusting the line speed by adjusting the motor speed.

Once the line speed is adjusted to a desired rate, objects 38 are placed on conveyor 10 in contact with rollers 108. Rollers 108 engage objects 38 and propel them forward in the desired direction. Each object 38 is engaged by a plurality of rollers. If objects 38 are jammed up at an end of conveyor 10, rollers 108 will not be able to move objects 38 forward. The stationary objects will exert a resistive torque on rollers 108 equal to the downward force on the rollers applied by the object multiplied by the coefficient of friction between the rollers and the object, in turn multiplied by the radius of the rollers. If the resistive torque is greater than the available clutching torque, then rollers 108 will stop rotating while sprockets 90 continue to rotate. This is the preferred result when objects 38 stall. However, if resistive torque is less than the clutching torque, rollers 108 will continue to rotate with sprockets 90. If this occurs, nut 112 should be adjusted to reduce the clamping load.

The load at which roller 108 will begin to slip is preferably altered to suit the object being conveyed. This can be achieved by threading torque prevailing clamping nut 112 to either increase or decrease the load induced by wave washers 116 as is required.

When roller 108 is stalled, interbushing 86 continues to rotate, as do torque prevailing clamping nut 112 and sleeve 100 because of the engagement between finger 104 and roller sprocket 90. The unitary rotation ensures that there is no relative rotation between wave washers 116 or shimings 118 and either sleeve 100 or bushing portion 94. This lack of relative rotation prevents any wear of wave washers 116 or shimings 118, thereby overcoming a significant disadvantage of some known clutching systems.

A preferred embodiment of the invention has been disclosed. A worker of ordinary skill in the art would realize, however, that certain modification would come within the teaching of this invention. For example, although sleeve 100 is shown with only one finger, it could be provided with two or more fingers, and roller sprocket 90 provided with the necessary number of associated slots 96. Also, while roller assembly 14 has been described as employing wave washers to provide the desired axial spring load, Belleville spring washers could be used in their place. Also, certain of the features could be used in conveyor systems with slightly different configurations. For example, the disclosed roller assemblies could be used with chains as well as with belts. Further, while materials have been called out for certain elements of the invention, other materials could be substituted for the material specified, depending on the ultimate use of the conveyor 10. The following claims should be studied in order to determine the true scope and content of the invention.

We claim:

1. A power roller conveyor system comprising:

an elongated rail member having a first longitudinally extending slot;

cantilevered roller assembly having two ends, the first end threadably engaging a nut slidably and non-rotatably disposed in the longitudinally extending slot; and a support fixed to the rail member below the roller assembly and supporting the second end of the roller assembly.

2. A power roller conveyer system as claimed in claim 1 wherein the support is fixed to the rail member by a screw passing therethrough into a nut slidably in a second longitudinally extending slot in the rail member.

3. A power roller conveyer system as claimed in claim 2 wherein the support has a longitudinally extending neck portion approximately equal in width to a width of the second longitudinally extending slot and extending thereinto and controlling the position of the support relative to the rail member.

4. A power roller conveyer system as claimed in claim 2 wherein the rail member has a b shaped section with the first longitudinally slot being disposed in an upper portion of the rail member and the second longitudinally extending slot being disposed in a lower portion of the rail member.

* * * * *

UNITED STATES PATENT AND TRADEMARK OFFICE
CERTIFICATE OF CORRECTION

PATENT NO. : 5,971,137
DATED : October 26, 1999
INVENTOR(S) : Grant et al

It is certified that error appears in the above-identified patent and that said Letters Patent is hereby corrected as shown below:

Claim 1, column 10, line 18, insert --a-- before "cantilevered";
line 22, insert --,-- after "assembly" and before "and supporting"

Signed and Sealed this

Second Day of May, 2000

Attest:

Q. TODD DICKINSON

Attesting Officer

Director of Patents and Trademarks